United States Patent [19]
Whitaker et al.

[11] Patent Number: 5,603,842
[45] Date of Patent: Feb. 18, 1997

[54] PROCESS FOR TREATMENT OF SLUDGE

[75] Inventors: Roy L. Whitaker, Advance; Randall S. Tuttle, Winston-Salem, both of N.C.

[73] Assignee: Amsco, Incorporated, Clemmons, N.C.

[21] Appl. No.: 423,971

[22] Filed: Apr. 18, 1995

[51] Int. Cl.$^6$ .................................................. C02F 11/14
[52] U.S. Cl. ............................ 210/743; 210/751; 210/764
[58] Field of Search .................................... 210/609, 743, 210/751, 764–766

[56] References Cited

U.S. PATENT DOCUMENTS

| | | | |
|---|---|---|---|
| 4,902,431 | 2/1990 | Nicholson et al. | 210/751 |
| 4,997,572 | 3/1991 | Wurtz | 210/751 |
| 5,013,458 | 5/1991 | Christy, Sr. et al. | 210/751 |
| 5,135,664 | 8/1992 | Burnham | 210/751 |
| 5,259,977 | 11/1993 | Girovich et al. | 210/751 |
| 5,422,015 | 6/1995 | Angell | 2210/751 |
| 5,429,750 | 7/1995 | Steele | 210/751 |

OTHER PUBLICATIONS

Lime, Handling, Application and Storage, Bulletin 213, Published by National Lime Association, Seventh Edition 1995.

*Primary Examiner*—Thomas G. Wyse
*Attorney, Agent, or Firm*—Paul & Paul

[57] ABSTRACT

A process is provided for the alkaline stabilization of substantially liquid sludge which includes the steps of providing sludge of low solids content to a basin, and providing alkaline additive in sufficient quantity to the sludge in the basin to increase the ph of the sludge to a level above 12 by utilizing a sludge/alkaline blending Y. The blending Y has a sludge arm conduit, an alkaline arm conduit, and an exit conduit. Alkaline additive is provided to the alkaline arm conduit and recirculated sludge/alkaline mixture is drawn from the basin and is provided to the sludge arm conduit. A sludge/alkaline mixture containing newly added alkaline additive exits through the exit conduit of the Y. The recirculated sludge/alkaline and alkaline additive are mixed and thoroughly intermingled as they pass through the Y. The contents of the basin are thoroughly mixed by mixers such that all particles of the sludge/alkaline mixture in the basin have a Ph level of at least approximately 12 and the pH of the sludge/alkaline mixture is maintained at this level for at least approximately 2 hours. Finally, the pH of the sludge alkaline mixture is maintained at a level above approximately 11.5 for at least approximately 22 hours. A substantial reduction of pathogens and vector attractiveness of the resulting mixture is realized. An apparatus for achieving the same is also provided.

7 Claims, 2 Drawing Sheets

5,603,842

PROCESS FOR TREATMENT OF SLUDGE

BACKGROUND OF THE INVENTION

The present invention relates generally to a process and apparatus for the alkaline stabilization of sludge.

In particular, the present invention relates to a process and apparatus for the treatment of substantially liquid sludge with an alkaline additive to reduce pathogens and vector attractiveness. A useful end product is provided that will allow beneficial re-use of sludge, such as enabling the sludge to be applied to land on which crops may be grown. The invention includes a unique method and apparatus for adding an alkaline additive to substantially liquid sludge to raise the pH of the resulting mixture to a predetermined level for a predetermined period of time to neutralize pathogens and reduce vector attractiveness (rats, mice, and flies).

Under the relevant Environmental Protection Agency Regulations, to reduce the pathogens in the sludge to the required level, a pH level above 12 must be maintained for at least two hours. Additionally, to reduce the vector attractiveness in the sludge to the required level, a pH level of at least 11.5 must be maintained for at least 22 hours.

Prior to the present invention, when an alkaline additive, such as lime, was put into a basin, it often settled to the bottom of the tank, and a sufficient pH level was not reached due to inadequate methods of adding the alkaline additive to the basin containing the sludge.

SUMMARY OF THE INVENTION

This invention relates to a process and apparatus for the treatment of sludge. Using the process and apparatus of the present invention, pathogens and vector attractiveness are reduced such that a useful end product is provided that will allow beneficial re-use of sludge, such as enabling the sludge to be applied to land on which crops may be grown. The process includes a method for treating substantially liquid sludge comprising the steps of providing sludge of low solids content to a basin, providing alkaline additive in sufficient quantity to the sludge in the basin to increase the ph of the sludge to a level above 12 by utilizing a sludge/alkaline blending Y. The blending Y has a liquid sludge arm conduit, an alkaline arm conduit, and an exit conduit. Alkaline additive is provided to the alkaline arm conduit and initially liquid sludge that eventually contains an increased percentage of recirculated liquid sludge/alkaline mixture is drawn from the basin and is provided to the sludge arm conduit. A liquid sludge containing a range of alkaline from none to some added alkaline plus newly added alkaline additive exits through the exit conduit of the Y. The recirculated sludge/alkaline and alkaline additive are mixed and thoroughly intermingled as they pass through the Y. Optionally, the contents of the basin are thoroughly mixed by mixers such that all particles of the sludge/alkaline mixture have a Ph level of at least approximately 12 and the pH of the sludge/alkaline mixture is maintained at this level for at least approximately 2 hours. Finally, the pH of the sludge alkaline mixture is maintained at a level above approximately 11.5 for at least approximately 22 hours. A substantial reduction of pathogens and vector attractiveness of the resulting mixture is realized. An apparatus for achieving the same is also provided.

The present invention provides an alkaline stabilization process and apparatus for the treatment of sludge.

Therefore, it is a general object of the present invention is to provide a new and improved process and apparatus for the alkaline stabilization of sludge.

A further object of the present invention is to provide a process and apparatus for the treatment of sludge that is accomplished as a batch process.

A further object of the present invention is to provide a process and apparatus for the treatment of sludge without the requirement to store an alkaline additive on sight such that the additive is fresher such that caking or bridging of the additive is minimized and such that touching and breathing of the alkaline additive is minimized.

A further object of the present invention is to provide a process and apparatus for the treatment of sludge such that thorough and complete mixing of sludge with alkaline is accomplished utilizing a minimum amount of alkaline additive.

A further object of the present invention is to provide a process and apparatus for the treatment of sludge such that thorough and complete mixing of sludge with alkaline is accomplished utilizing a minimum amount of alkaline additive that utilizes no supplemental fresh water supply.

A further object of the present invention is to provide a process and apparatus for the treatment of sludge that may be accomplished on sight in a single basin at a single location without moving the sludge to processing equipment.

A further object of the present invention is to provide a process and apparatus for the treatment of sludge that is portable.

Other objects and advantages of the present invention will become apparent from the following description taken in conjunction with the accompanying drawings.

DETAILED DESCRIPTION OF THE PREFERRED EMBODIMENT

Figure 1:
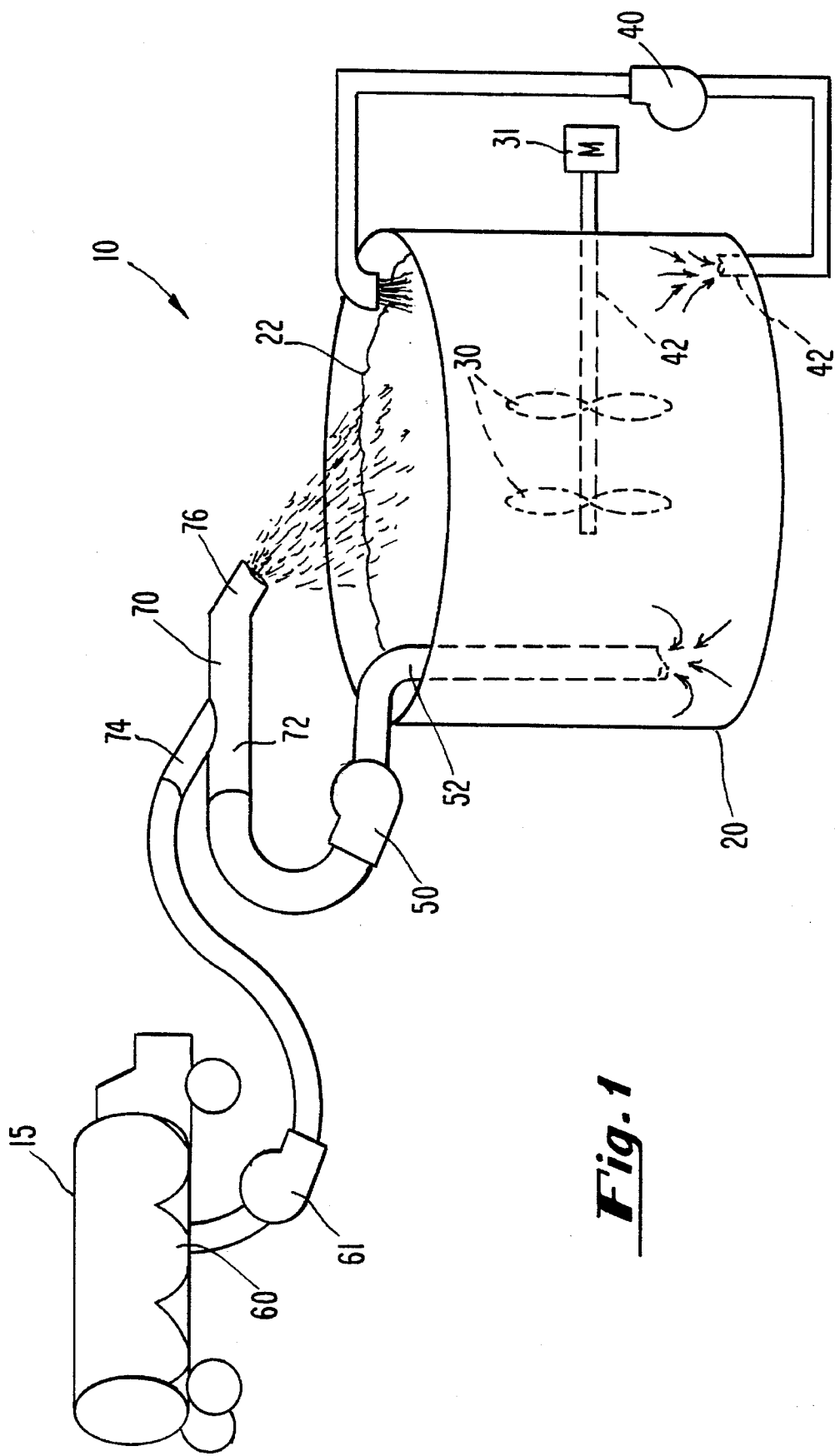
FIG. 1 is a schematic diagram of one preferred embodiment of a method and apparatus for the alkaline stabilization of sludge in accordance with the present invention.
Figure 2:
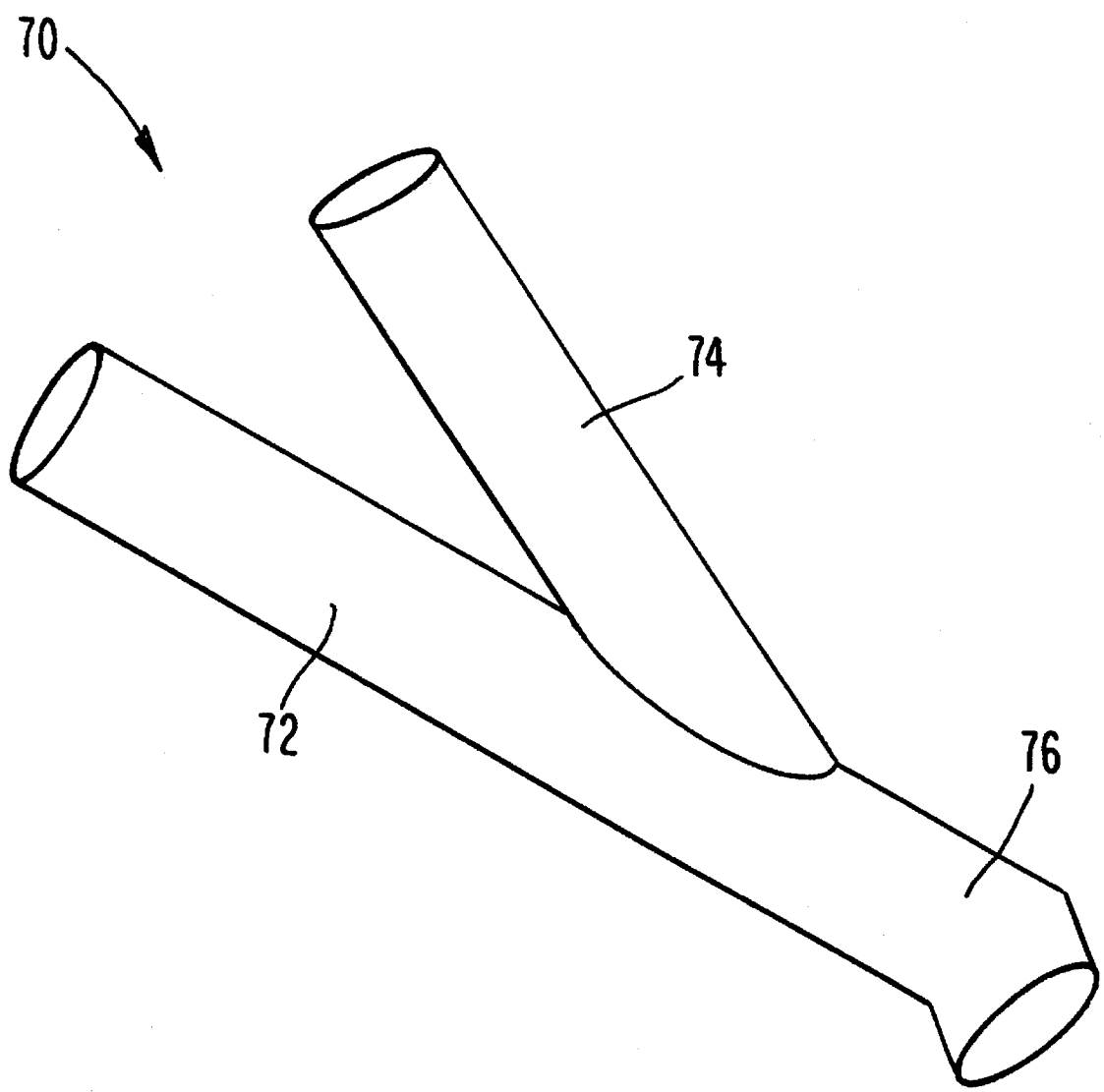
FIG. 2 is a perspective view of a blending Y for use in the method and apparatus of FIG. 1.

Referring now in detail to the drawings, wherein like numbers indicate like elements throughout the several views, there is shown in FIG. 1 a schematic diagram of a method and apparatus for treating sludge 10 in accordance with one preferred embodiment of the present invention. As can be seen in FIG. 1, the system 10 generally includes a large, open basin 20 usually capable of containing up to many thousands of gallons of liquid (less than 10% solids) sludge 22. For example, the basin 20 may be capable of holding approximately 800,000 gallons of untreated sludge. In the preferred embodiment, such substantially liquid sludge typically has a solids content less than approximately 10 percent, and more typically 1% to 6%.

Within the basin, there is preferably provided a pair of mixer blades 30, driven, e.g. via a motor 31 and shaft 32, capable of mixing the contents of the basin, such that the contents of the basin 20 may be mixed to a substantially homogeneous condition to equalize the pH of the sludge/alkaline mixture within the basin 20. Such a mixer may alternatively be of any type known in the art of sludge treatment, such as rotary blades, auger screws, and the like.

Such a mixer 30 is typically an integral part of such basins for use in treatment of sludge. Additionally, in the preferred embodiment, a recirculation pump 40 may be used, such that more thorough mixing may be obtained within the basin 20 due to settling of solids within the tank. The recirculation pump 40 may pull contents of the tank from a wet well 42, preferably located within the basin 20 at the farthest point, or at least a remote point, from the mixers 30, as shown, and transfer these contents to another region of the basin 20, thus providing additional mixing. Intimate mixing of the sludge and alkaline additive mixture is provided in basin 20 such that the pH of the sludge begins to rise, stabilizing at or above the desired level which, in the preferred embodiment, is a pH of at least about 12. Preferably, mixing is typically accomplished such that complete mixing in both vertical and horizontal planes is accomplished. In this regard, if, for example, there is not vertical mixing, the solids content might be, for example, 1% solids at the top of the liquid and 6% at the top of the liquid. By mixing in both vertical and horizontal planes, this undesirable condition may be avoided.

The mixing of the sludge and alkaline additive at atmospheric conditions, leads to a hydration reaction:

$$CaO + H_2O = Ca(OH)_2 + Heat.$$

Using stoichiometric quantities, the reaction gives:

56 lbs. of $CaO$ + 18 lbs. $H_2O$ = 74 lbs. of $Ca(OH)_2$ as well as releasing 27,500 BTU's per pound mole.

No supplemental water is required for the present invention since sufficient water for the above reaction is available in the substantially liquid sludge in the basin 20. A rough recipe of alkaline additive to sludge is approximately 1 ton alkaline per 30,000 to 50,000 gallons of sludge. However, variables come into play here, such as the initial pH of the sludge, the solids content of the sludge, and other properties of the sludge to be treated. However, an excess of alkaline additive is not detrimental to the requirements for bringing the pH up above a desired level. Heat is produced by the exothermic reaction, but is not required for the present invention. Since the resultant sludge/alkaline mixture is for land application, and since farmers generally desire to add alkaline to the land to increase the ph, supplying an excess of alkaline does not hurt treatment of the sludge. Thus, if an excess of alkaline accrues at the bottom of the basin due to incomplete mixing, no harm is done so long as sufficient alkaline material is mixed to meet the requirements of Part 503 for class B treatment, not requiring pasteurization.

In the preferred embodiment, the process is conducted as a batch operation. Initially, the basin 20 may contain untreated, or partially treated sludge. The alkaline additive is added by the unique method of the present invention using the unique apparatus of the present invention, in sufficient quantities such that the pH level of the resulting mixture is increased to a desired level for a desired period of time such that the requirements of the Environmental Protection Agency under 40 C.F.R. Part 503 are met.

In the preferred embodiment, the alkaline additive may typically be provided by a pneumatic tanker truck 15. Such a tanker truck 15 may typically hold approximately 24–25 tons of alkaline additive and may deliver approximately 18 to 22 tons of such alkaline. Care should be used such that no blockage or bridging of the alkaline additive occurs in the truck 15 during delivery.

An initial pH level of the sludge in the basin 20 is measured to determine the appropriate quantity of alkaline additive to be added. In the preferred embodiment, calcium oxide is the preferred alkaline additive to be used. However, the present invention can also utilize hydrated lime or other alkaline. Calcium oxide is best because there is a faster chemical reaction with the biosolids, the granule size is larger than hydrated lime, and there is reduced risk of dust. Furthermore, calcium oxide mixes well with water. Calcium hydroxide may also be used, although it does not create an exothermic reaction as does calcium oxide. Calcium hydroxide does not mix as well with water. Other alkaline materials may also be used; however these may have properties that are not as desirable as those of calcium oxide.

The alkaline delivery elements of the preferred embodiment of the present invention comprise a sludge/alkaline pump 50, a source of alkaline additive 60 (e.g. from truck 15) and a blending Y 70. These three elements, 50, 60, and 70 are the major elements of the system 10 for providing a proper quantity of alkaline additive, adequately intermixed with sludge, to yield a desired level of pH of the contents of the basin 20 for a desired period of time.

Initially, the substance in the basin 20 is typically entirely substantially liquid sludge. The pump 50 first draws such sludge from preferably a location near the bottom of the basin 20 through conduit 52 and provides it to one arm of the Y 70, hereinafter called the sludge arm conduit 72. Such arm 72 may typically be a pipe of four to six inch diameter. The pump 50 may provide such sludge, for example, at a rate of 300 to 500 gallons per minute. An alkaline additive is then metered into the other arm of the Y, 70, herein after called the alkaline arm conduit 74. Such metering may be accomplished by utilizing compressed air at a pressure of, for example, approximately 8 to 10 pounds per square inch to propel the alkaline additive into the alkaline arm conduit 74 by means of a pump 61 or equivalent pressure delivering means. Such alkaline additive is preferably metered into the Y 70 at a rate such that approximately 20 tons of alkaline additive is delivered to the Y over a period of approximately 1½ to 2 hours for the above example of a basin 20 containing 800,000 gallons of sludge. Once the metering of the alkaline additive begins, the pump 50 delivers a mixture of sludge and alkaline additive through the Y 70.

The sludge, and then the sludge mixture (once the alkaline is added) is delivered into the Y 70 through the sludge arm conduit 72 at a high rate relative to the alkaline additive being metered through the alkaline arm conduit 74. A partial vacuum effect is created by the sludge/alkaline mixture passing through the Y 70 which educts or pulls the additive into the Y 70 and thoroughly mixes and intermingles the sludge and the alkaline within the Y 70. The mixture then exits the Y 70 through exit conduit 76 and then the mixture re-enters basin 20 such that the resulting sludge/alkaline mixture is easily mixed in with the sludge/alkaline mixture in the basin 20. The conduit 72, 74, 76 diameters are designed such that a proper vacuum level is maintained when utilizing the desired flow rates. Intermingling of the alkaline additive and the sludge is thus thorough and fast and the complete mixing for the hydration reaction noted above occurs within the Y 70. The sludge/alkaline mixture is delivered back to a different location than it was drawn from, enabling thorough mixing within the tank.

Upon completion of the addition of the required quantity of alkaline additive to the basin through the Y 70, the pH level of the sludge/alkaline mixture is measured to ensure it is at least approximately 12. Environmental Protection Agency rules state that this level must be maintained for at least 2 hours to neutralize pathogens. Therefore, the pH level of the sludge/alkaline mixture is again measured at least two hours subsequent to the time of the pH measurement after the addition of the alkaline additive to ensure this requirement has been met. If the pH level has decreased below 12, more alkaline additive must be added, the pH remeasured, and the 2 hour time period restarted. If the pH level remains above 12, the mixture is then tested after 22 hours to ensure that the pH remains above 11.5. If it does, the Environmental Provisions of Part 503 are complied with and the sludge is a Class B sludge which may then be suitable for appropriate land application. Thus, the total time required for the method of the present invention using the above example, which operates as a batch process, is approximately 26 hours which breaks down as follows: alkaline addition—approximately 2 hours (dependent upon the quantity of alkaline additive required); pathogen reduction (2 hours at ph above 12) approximately 2 hours; vector attractiveness reduction (22 hours at ph above 11.5).

It is understood that the preferred embodiment of the present invention provides a method and apparatus to destroy pathogens and reduce vector attractiveness by maintaining every particle of sludge at a desired elevated pH.

It is further understood that any type of basin 20 can be utilized that is known in the art of sludge treatment including a reservoir, tank, lagoon, and the like, provided that thorough mixing of the sludge and alkaline additive can be achieved.

The apparatus of the present invention may be constructed such that it is compact to fit entirely in the bed of a pick-up truck.

Environmental Protection Agency regulations require municipalities to certify, under penalty of law, that the treated sludge complies with all regulations. The sludge treatment process of the current invention facilitates compliance with all the certifications required under 40 C.F.R. Part 503 for class B sludge.

The above description and the figures depicted are for purposes of illustration only and are not intended to be, and should not be construed as limitations on the invention.

Moreover, certain modifications or alternatives may suggest themselves to those skilled in the art upon reading of this specification, all of which are intended to be within the spirit and scope of the present invention as defined in the appended claims.

We claim:

1. A method for treating substantially liquid sludge comprising:

(a) providing sludge of less than 10% solids content to a basin;

(b) providing an alkaline additive in sufficient quantity to the sludge in the basin to increase the ph of the sludge in the basin to a level above approximately 12;

(c) providing a sludge/alkaline blender having a sludge arm conduit, an alkaline arm conduit, and an exit conduit;

(d) delivering alkaline additive to the alkaline arm conduit;

(e) delivering recirculated sludge/alkaline mixture drawn from the basin to the sludge arm conduit;

(f) thoroughly intermingling within the sludge/alkaline blender newly added alkaline additive with the sludge/alkaline mixture drawn from the basin;

(g) delivering sludge/alkaline mixture containing newly added alkaline additive thoroughly intermingled with the recirculated sludge/alkaline mixture through the exit conduit of the blender;

(h) mixing the sludge and alkaline mixture in the basin to ensure substantially all particles of the sludge alkaline mixture have a pH level of at least approximately 12;

(i) maintaining the pH of the sludge/alkaline mixture in the basin at a level above approximately 12 for at least approximately 2 hours; and (j) maintaining the pH of the sludge/alkaline mixture in the basin at a level above approximately 11.5 for at least approximately 22 hours;

whereby pathogens and vector attractiveness of the resulting sludge/alkaline mixture are substantially reduced.

2. The process of claim 1, wherein the step of providing a sludge/alkaline blender includes providing a sludge/alkaline blender in substantially the shape of a Y.

3. The process of claim 2, wherein the step of delivering alkaline additive includes delivering the alkaline additive to the alkaline arm of the blender by propelling the alkaline additive using pressurized air.

4. The process of claim 2, wherein the step of delivering the sludge/alkaline mixture is accomplished by pumping sufficient recirculated sludge/alkaline mixture through the sludge arm of the blender whereby a partial vacuum is created such that the alkaline additive is drawn by eduction from the alkaline arm of the blender and fully mixes and intermingles with the sludge/alkaline mixture within the blender.

5. The method of claim 2, wherein the steps occur as a batch process.

6. The process of claim 2, wherein the step of mixing includes mixing the sludge alkaline mixture in the basin whereby pH distribution throughout the tank is equalized.

7. The method of claim 2, wherein the process additionally comprises the steps of removing the sludge alkaline mixture from the basin and disbursing the treated sludge upon farm land.

\* \* \* \* \*